US012377465B2

(12) United States Patent
Borkowski et al.

(10) Patent No.: US 12,377,465 B2
(45) Date of Patent: Aug. 5, 2025

(54) COMPLEX CONCENTRATED ALLOY AND HIGH ENTROPY ALLOY ADDITIVE MANUFACTURING SYSTEMS AND METHODS

(71) Applicant: Hamilton Sundstrand Corporation, Charlotte, NC (US)

(72) Inventors: Luke Borkowski, West Hartford, CT (US); Tahany I. El-Wardany, Vernon, CT (US); William K. Tredway, Manchester, CT (US); Colette O. Fennessy, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/329,543

(22) Filed: Jun. 5, 2023

(65) Prior Publication Data

US 2023/0321726 A1 Oct. 12, 2023

Related U.S. Application Data

(62) Division of application No. 16/657,492, filed on Oct. 18, 2019, now Pat. No. 11,666,973.

(51) Int. Cl.
*B22F 10/25* (2021.01)
*B22F 10/00* (2021.01)
(Continued)

(52) U.S. Cl.
CPC .............. *B22F 10/25* (2021.01); *B22F 10/00* (2021.01); *B22F 12/53* (2021.01); *B22F 12/58* (2021.01);
(Continued)

(58) Field of Classification Search
CPC .......... B22F 10/25; B22F 10/00; B22F 12/53; B22F 12/58; B22F 10/50; B22F 2999/00;
(Continued)

(56) References Cited

U.S. PATENT DOCUMENTS 5,993,554 A 11/1999 Keicher et al.
6,994,894 B2 * 2/2006 Hofmeister ......... C04B 35/4508
427/586
(Continued)

FOREIGN PATENT DOCUMENTS

CN 107971490 A 5/2018
WO 2013174449 A1 11/2013
(Continued)

OTHER PUBLICATIONS

Matej Balazic: "Additive Manufacturing and 3D Printing LENS Technology Additive Manufacturing of Metal Components Conference at IK4-LORTEK NOV", Additive Manufacturing of Metal Components Conference at IK4-LORTEK, Nov. 27, 2013 (Nov. 27, 2013).
(Continued)

*Primary Examiner* — Lawrence Averick
(74) *Attorney, Agent, or Firm* — Bachman & LaPointe, P.C.

(57) ABSTRACT

A complex concentrated alloy (CCA) and/or high entropy alloy (HEA) additive manufacturing nozzle can include a nozzle body defining at least four powder channels. Each powder channel can be configured to be connected to a powder supply of a plurality of powder supplies to receive a powder from the powder supply for ejecting the powder toward a build area to form an additively manufactured article having a CCA and/or an HEA.

10 Claims, 5 Drawing Sheets

(51) Int. Cl.
   *B22F 10/50* (2021.01)
   *B22F 12/53* (2021.01)
   *B22F 12/58* (2021.01)
   *B33Y 10/00* (2015.01)
   *B33Y 30/00* (2015.01)
   *B33Y 80/00* (2015.01)

(52) U.S. Cl.
   CPC ............... *B33Y 10/00* (2014.12); *B33Y 30/00* (2014.12); *B33Y 80/00* (2014.12); *B22F 10/50* (2021.01)

(58) Field of Classification Search
   CPC ........ B22F 3/24; B22F 2207/01; B33Y 10/00; B33Y 30/00; B33Y 80/00; B33Y 40/20; Y02P 10/25; B23K 26/144; B23K 26/1476; B23K 26/342
   See application file for complete search history.

(56) References Cited

U.S. PATENT DOCUMENTS

| | | | |
|---|---|---|---|
| 11,999,011 B1* | 6/2024 | Moorehead | B22F 10/25 |
| 2006/0266740 A1* | 11/2006 | Sato | B23K 26/144 |
| | | | 219/121.84 |
| 2011/0220621 A1* | 9/2011 | Pieger | B23K 35/0244 |
| | | | 219/121.85 |
| 2017/0203391 A1* | 7/2017 | Budge | B23K 15/0086 |
| 2018/0200834 A1* | 7/2018 | Kilmer | C22C 30/00 |
| 2018/0363104 A1 | 12/2018 | Fujieda et al. | |
| 2019/0226058 A1 | 7/2019 | Fujieda et al. | |

FOREIGN PATENT DOCUMENTS

| | | |
|---|---|---|
| WO | 2015/189600 A2 | 12/2015 |
| WO | 2016044876 A1 | 3/2016 |

OTHER PUBLICATIONS

Polanski M et al: "Combinatorial synthesis of alloy libraries with a progressive composition gradient using laser engineered net shaping (LENS): Hydrogen storage alloys", International Journal of Hydrogen Energy, Elsevier Science Publishers B.V., Barking, GB, vol. 38, No. 27, Jun. 19, 2013 (Jun. 19, 2013) pp. 12159-12171.
Extended European search report issued in corresponding EP application No. 19214491.3, dated May 6, 2020.

* cited by examiner

COMPLEX CONCENTRATED ALLOY AND HIGH ENTROPY ALLOY ADDITIVE MANUFACTURING SYSTEMS AND METHODS

CROSS-REFERENCE TO RELATED APPLICATIONS

This application is a divisional of U.S. patent application Ser. No. 16/657,492, filed Oct. 18, 2019, the entire content of which is incorporated herein by reference.

FIELD

This disclosure relates to complex concentrated alloys (CCAs), e.g., high entropy alloys (HEAs), more particularly to CCA additive manufacturing systems and methods, for example.

BACKGROUND

High entropy alloys (HEAs) are a class of single-phase alloys which contain 5 or more elements, each with similar relative concentrations. A genus class of alloys, which includes HEAs, is known as complex concentrated alloys (CCAs) which can have less than 5 elements with concentrations of greater than 35% and have multiple phases.

These classes of alloys have been shown to provide beneficial characteristics such as high temperature capabilities as well as irradiation resistance, oxidation resistance, exceptional strength, and fracture toughness, even at cryogenic temperatures. In fact, refractory HEAs offer the potential for improved high temperature strength and specific strength relative to superalloys and conventional refractory alloys.

Manufacturing of HEAs is typically achieved through traditional approaches such as arc melting or drop casting. Additionally, these alloys have been manufactured using additive manufacturing (AM) techniques such as selective laser melting. Using AM methods, the powder precursor to the HEA is typically pre-mixed to yield a part with a constant composition throughout the build. Using this approach can limit the ability to manufacture parts with graded composition as well as quickly manufacturing parts for high throughput testing or characterization.

Such conventional methods and systems have generally been considered satisfactory for their intended purpose. However, there is still a need in the art for improved CCA and HEA additive manufacturing systems and methods. The present disclosure provides a solution for this need.

SUMMARY

A complex concentrated alloy (CCA) and/or high entropy alloy (HEA) additive manufacturing nozzle can include a nozzle body defining at least four powder channels. Each powder channel can be configured to be connected to a powder supply of a plurality of powder supplies to receive a powder from the powder supply for ejecting the powder toward a build area to form an additively manufactured article having a CCA and/or an HEA.

The at least four powder channels can include up to eight total powder channels in certain embodiments. For example, the at least four powder channels can include eight total powder channels.

The nozzle can include an energy application channel defined through the nozzle body and configured to pass energy to the build area to allow energy application to the powder ejected toward or on the build area. The energy application channel can be an optical channel for passing a laser.

The energy application channel can be surrounded by the powder channels. The powder channels can be disposed evenly and symmetrically around the energy application channel. An axis of the powder channels can intersect with an axis of the energy application channel such that powder that is ejected from the powder channels intersects with the laser.

In accordance with at least one aspect of this disclosure, an additive manufacturing system can include a complex concentrated alloy (CCA) and/or high entropy alloy (HEA) additive manufacturing nozzle as disclosed herein, e.g., as described above. The system can also include an energy applicator (e.g., a laser) configured to provide energy to the powder to sinter the powder to form an additively manufactured article, and the plurality of powder supplies connected to the powder channels, wherein the plurality of powder supplies includes the same number of powder supplies as there are powder channels, wherein each powder supply is different from the other powder supplies.

In accordance with at least one aspect of this disclosure, a method for additively manufacturing an article including a complex concentrated alloy (CCA) and/or a high entropy alloy (HEA) can include ejecting four or more (e.g., five or more) different powders simultaneously into a build area during additive manufacturing. The method can include sintering the four or more different powders to form the CCA and/or HEA in at least a portion of the additively manufactured article. The four or more different powders can be elemental powders, in certain embodiments (e.g., metal element powder and/or any other suitable element powder). It is contemplated that the different powders can include combinations of element powders and/or alloy powders.

The method can include cold working the CCA and/or HEA after forming the CCA and/or HEA. Cold working can include cold working between each successive layer of deposition, for example. The method can include forming a gradient composition in the CCA and/or HEA. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
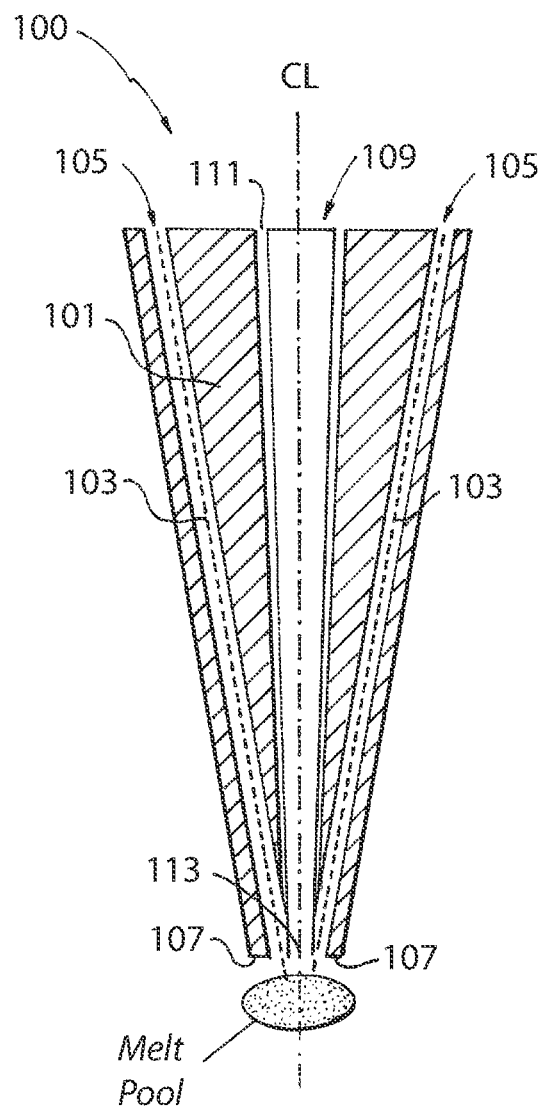
FIG. 1 is a cross-sectional view of an embodiment of a nozzle in accordance with this disclosure.

Reference will now be made to the drawings wherein like reference numerals identify similar structural features or aspects of the subject disclosure. For purposes of explanation and illustration, and not limitation, an illustrative view of an embodiment of a nozzle in accordance with the disclosure is shown in FIG. 1 and is designated generally by reference character 100. Other embodiments and/or aspects of this disclosure are shown in FIGS. 2-6D. Certain embodiments described herein can be used to additively manufacture articles out of unique alloys previously unavailable in the art.

Figure 2:
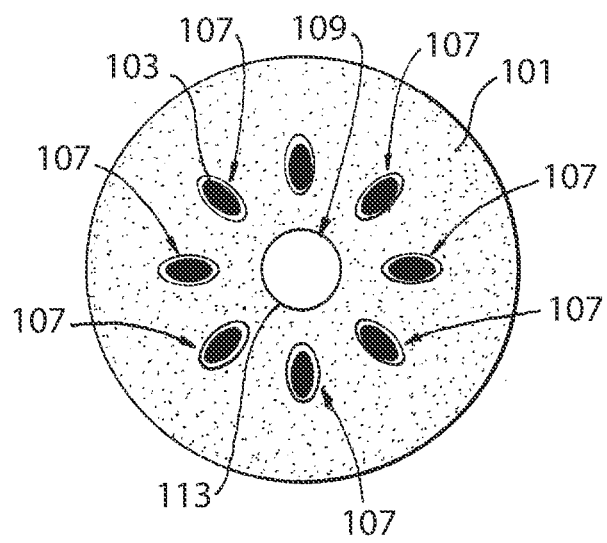
FIG. 2 is a plan view of the embodiment of FIG. 1.
Figure 3:
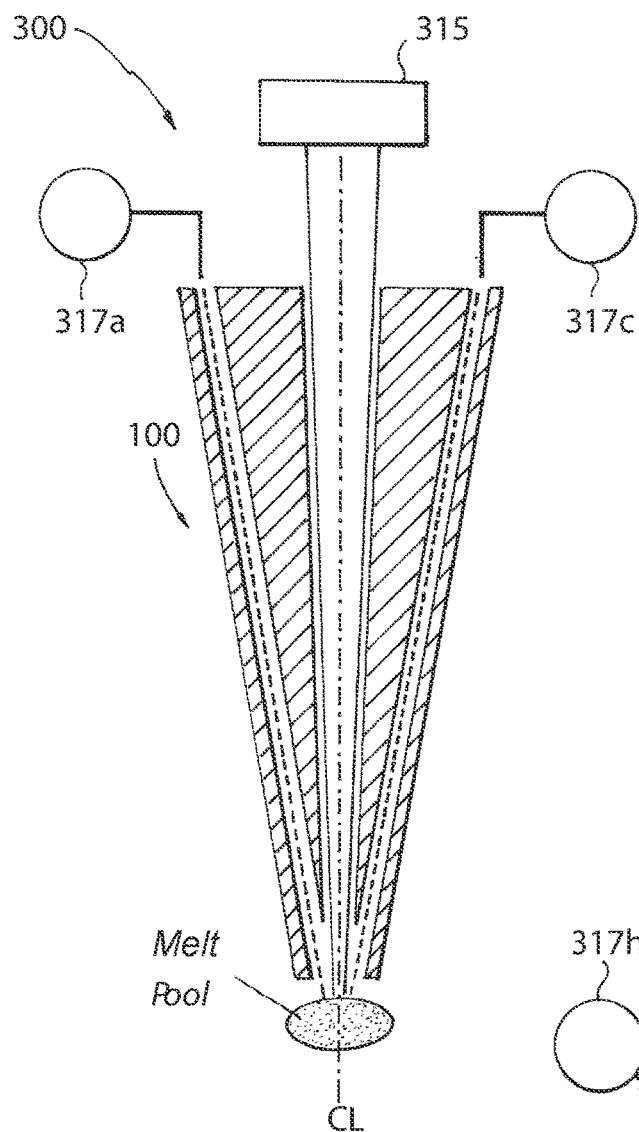
FIG. 3 is a cross-sectional view of an embodiment of a system in accordance with this disclosure.
Figure 4:
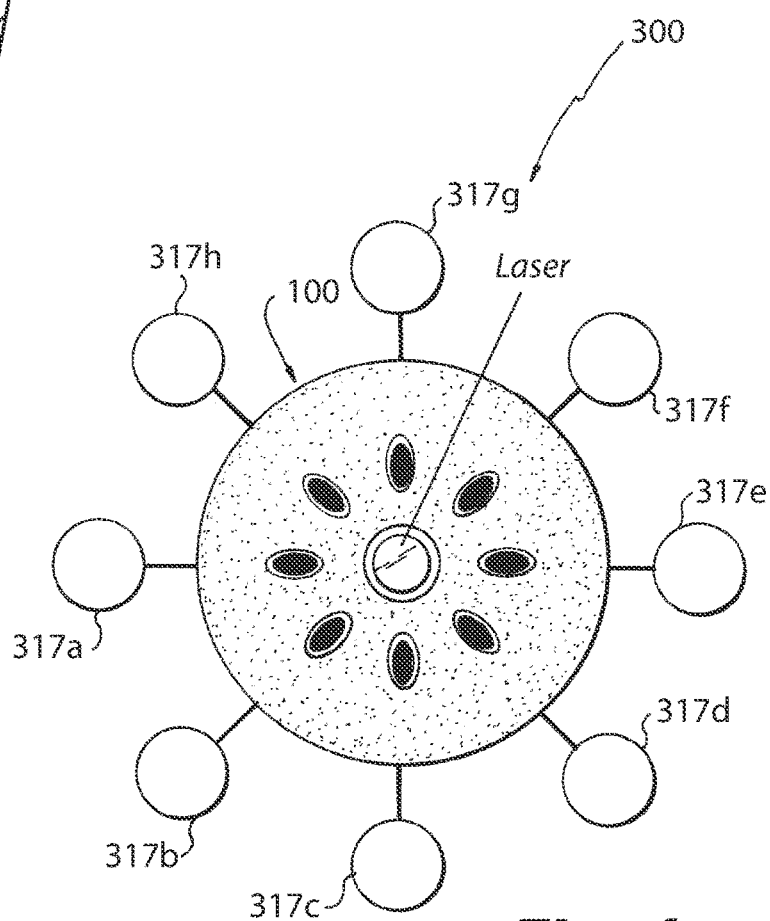
FIG. 4 is a plan view of the system of FIG. 3.

Referring to FIGS. 1 and 2, a complex concentrated alloy (CCA) and/or high entropy alloy (HEA) additive manufacturing nozzle 100 can include a nozzle body 101 defining at least four powder channels 103. Each powder channel 103 can be configured to be connected to a powder supply (e.g., as shown in FIGS. 3 and 4) of a plurality of powder supplies to receive a powder from the powder supply for ejecting the powder toward a build area to form an additively manufactured article (not shown) having a CCA and/or an HEA.

Each powder channel 103 can include a powder supply opening 105 configured to connect to the powder supply and an ejection opening 107 configured to eject powder toward a build area. The powder channels 103 can be a straight channel defined through the nozzle body 101 or have any other suitable shape. The powder channels 103 can be angled relative to a center line CL, e.g., as shown, to converge toward the center line CL (e.g., to cause intersection of a powder stream with a laser as a predetermined focal point). Any other suitable arrangement is contemplated herein.

The at least four powder channels 103 can include up to eight total powder channels in certain embodiments. For example, the at least four powder channels 103 can include eight total powder channels 103. Any other suitable number of powder channels 103 are contemplated herein. The powder channels 103 can include a constant flow area or can be configured to change in flow area along a powder flow direction.

The nozzle 100 can include an energy application channel 109 defined through the nozzle body 101 and configured to pass energy to the build area to allow energy application to the powder ejected toward or on the build area (e.g., to form a melt pool in the build area). The energy application channel 109 can be an optical channel (e.g., configured for receiving and/or including one or more optical elements) for passing a laser. The energy application channel 109 can be an open channel defined through the nozzle body 101.

The energy application channel 109 can include an inlet 111 for receiving a beam and an outlet 113 for outputting a beam. The inlet 111 can include a larger area than the outlet 113, e.g., as shown in FIG. 1, such that the energy application channel 109 tapers toward the build area. Any other suitable shape (e.g., constant area along the length of nozzle body 101) is contemplated herein. Any suitable number of energy application channels 109 are contemplated herein.

The energy application channel 109 can be surrounded by the powder channels 107, e.g., as shown in FIG. 2. The powder channels 103 can be disposed evenly and symmetrically around the energy application channel 109, for example. Any other suitable pattern of powder channels 103 (e.g., not symmetric or evenly spaced) is contemplated herein. An axis (e.g., defined down a centerline and/or the line of powder ejection) of the powder channels 103 can intersect with an axis (e.g., the center line CL) of the energy application channel 109 such that powder that is ejected from the powder channels 103 intersects with the laser.

Referring to FIGS. 3 and 4, in accordance with at least one aspect of this disclosure, an additive manufacturing system 300 can include a complex concentrated alloy (CCA) and/or high entropy alloy (HEA) additive manufacturing nozzle 100 as disclosed herein, e.g., as described above. The system 300 can also include an energy applicator 315 (e.g., a laser, an electron beam source) configured to provide energy to the powder to sinter the powder to form an additively manufactured article with successively sintered layers.

The system 300 can also include the plurality of powder supplies 317*a, b, c, d, e, f, g, h* connected the powder channels 103. The plurality of powder supplies 317*a-h* can include the same number of powder supplies as there are powder channels 103, for example (e.g., one unique powder supply connected to each powder channel 103). Each powder supply 317*a-h* can be different from the other powder supplies 317*a*. The powders can be elemental powders, in certain embodiments (e.g., metal element powder and/or any other suitable element powder). It is contemplated that the different powders can include combinations of element powders and/or alloy powders.

The system 300 can include a controller (not shown) configured to control a feed rate of powder from each powder supply 317*a-h* to control a composition (e.g., the percentage of each powder in the layer or portion of the layer) of the CCA and/or HEA that is formed (e.g., to have sufficient quantities of four or more elements to classify as a CCA or HEA composition). The controller can include any suitable hardware and/or software module(s) configured to perform and suitable method and/or function and/or portion thereof disclosed herein and/or otherwise.

The system 300 can include any other suitable components desired and/or needed to function to eject powder and sinter powder. The feed rate of each powder in a single layer can be controlled as a function of position on the layer and/or layerwise. In certain embodiments, the controller can be configured to create a gradient of composition in any suitable direction (e.g., in the layerwise z-axis direction).

It is contemplated that the system 300 can be configured to only make CCA and/or HEA compositions (e.g., configured to not make compositions of less than five elements such that at least five powder channels 103 are used for every additive manufacturing process). In certain embodiments, it is contemplated that the system 300 can be configured to make compositions that do not classify as CCA and/or HEA compositions (e.g., such that at least a portion of an additively manufactured article does not have a CCA and/or HEA composition). Any other suitable configuration or use of the system 300 is contemplated herein.

Figure 5:
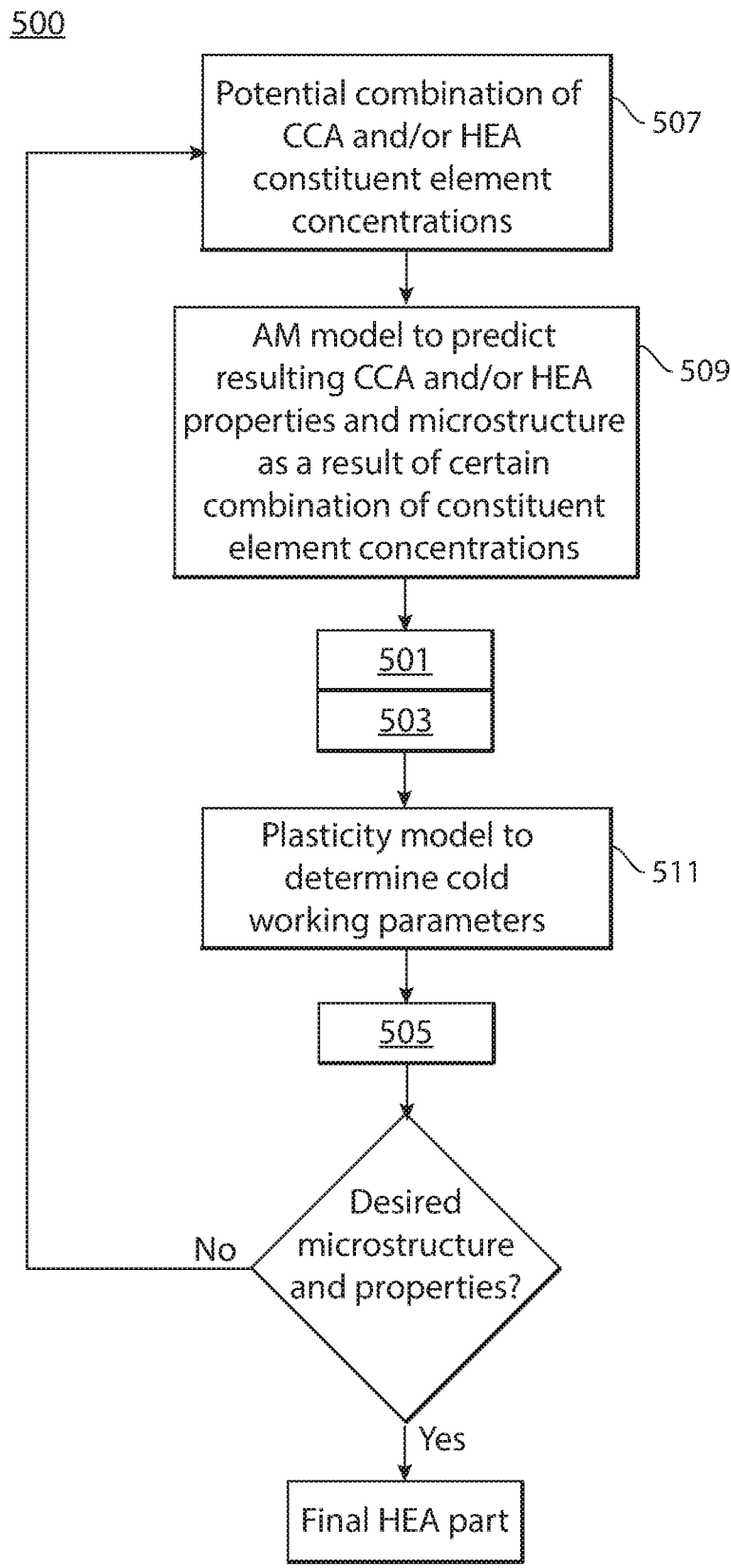
FIG. 5 is flow diagram of an embodiment of a method in accordance with this disclosure.

In accordance with at least one aspect of this disclosure, referring to FIG. 5, a method 500 for additively manufacturing an article including a complex concentrated alloy (CCA) and/or a high entropy alloy (HEA) can include ejecting 501 four or more (e.g., five or more) different powders simultaneously into a build area during additive manufacturing. The method 500 can include sintering 503 the four or more different powders to form the CCA and/or HEA in at least a portion of the additively manufactured article. Such a process can be done with directed energy deposition (DED) or any other suitable type of additive manufacturing process that allows selective deposition of material. The four or more different powders can be elemental powders, in certain embodiments (e.g., metal element powder and/or any other suitable element powder). It is contemplated that the different powders can include combinations of element powders and/or alloy powders, for example.

The method 500 can include cold working 505 the CCA and/or HEA after forming the CCA and/or HEA. Cold working 505 can include cold working between each successive layer of deposition, for example. Cold working 505 can include cold working after completion of formation of the article.

The method can include forming a gradient composition in the CCA and/or HEA. For example, the gradient composition can increase in CCA and/or HEA composition from a bulk material to a surface. Any other suitable gradient is contemplated herein. The method 500 can include any other suitable method(s) and/or portion(s) thereof.

For example, the method 500 can include one or more portions to determine what powders and/or ratios thereof are possible to form a CCA or HEA having one or more desired properties. In certain embodiments, the method 500 can include selecting 507 one or more potential combinations of HEA constituent element concentrations, and modeling 509 the additive manufacturing to predict the resulting HEA properties and/or microstructure as a result. The method 500 can include plasticity modeling 511 to determine cold working parameters to be applied to a layer and/or the formed article. In certain embodiments, if the final article has the desired microstructure and properties, the method 500 can be complete. In certain embodiments, if the final article does not have the desired microstructure and/or properties, the method 500 and/or any suitable portion(s) thereof can be repeated.

After the identification of the constituent element concentrations in the customized high temperature alloy, a layer can be deposited on a substrate with the desired part cross section. After deposition of the layer, a cold working attachment (e.g., standalone) can be used to mechanically treat the deposited surface to induce compressive residual stress, reduce part distortion, and control the microstructure grain size. To induce the cold work, a standalone system can be installed on a multiple axis DED machine table, for example.

Cold working can induce plastic deformation and increase dislocation density leading to a compressive residual stress profile along the depth of the deposited layer. The high density of dislocations imposed by this method can help in maintaining the compressive residual stress in addition to the reduction of grain size during the heat treatment that occurs when depositing subsequent layers. The deposited layer thickness can define the load required to apply the cold work. In addition, cold working the part after each layer can provide the capability to tailor the residual stresses throughout the bulk of the material as opposed to only on the surface using traditional methods.

Figure 6A:
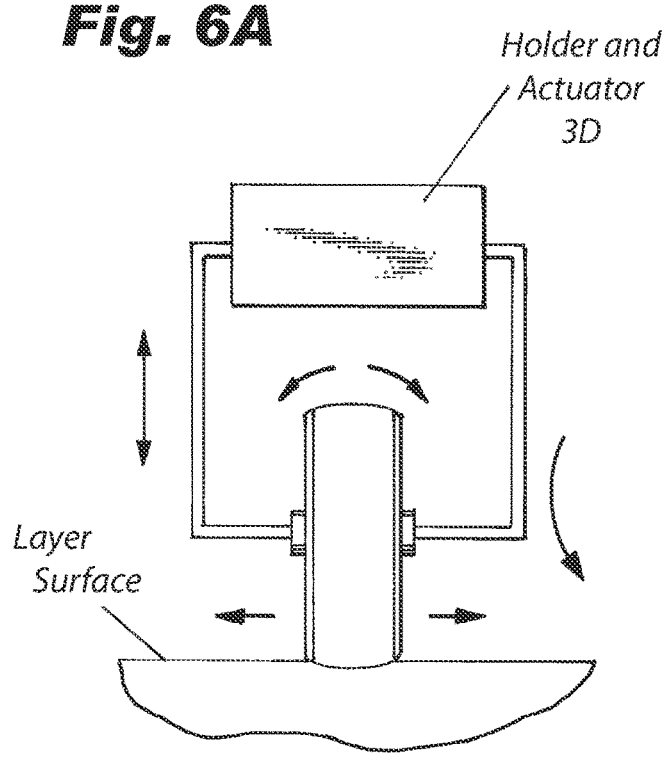
FIGS. 6A, 6B, 6C, and 6D show embodiments of cold working processes in accordance with this disclosure.
Figure 6B:
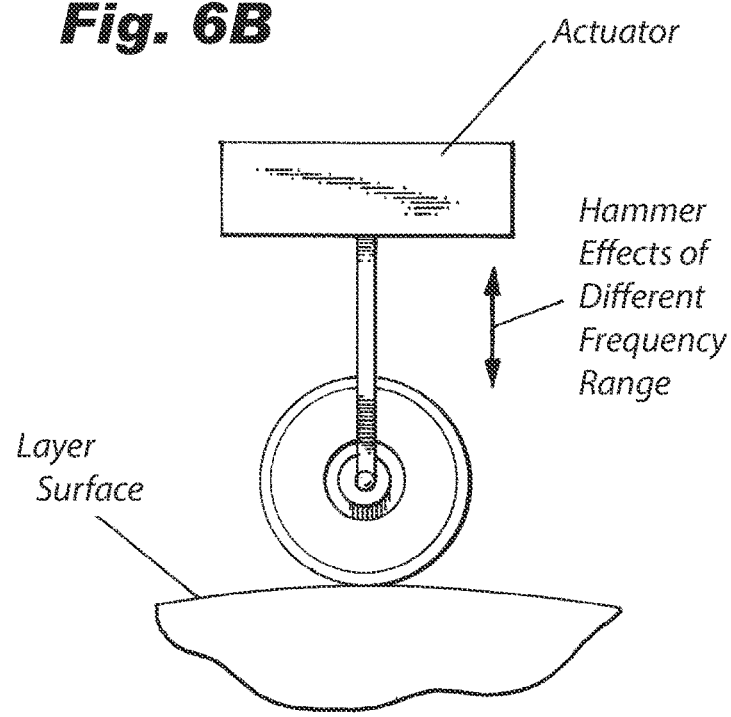
Figure 6C:
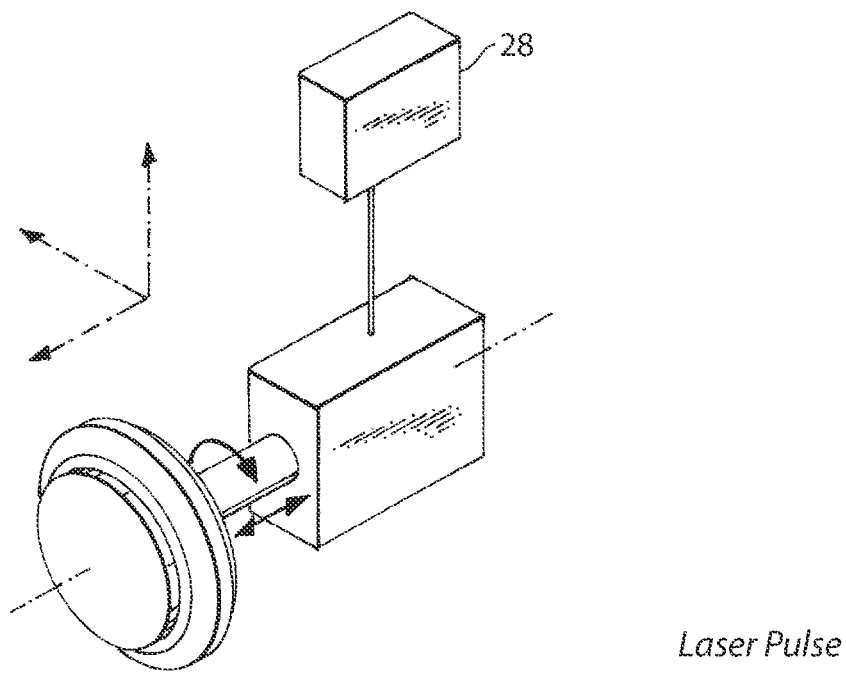
Figure 6D:
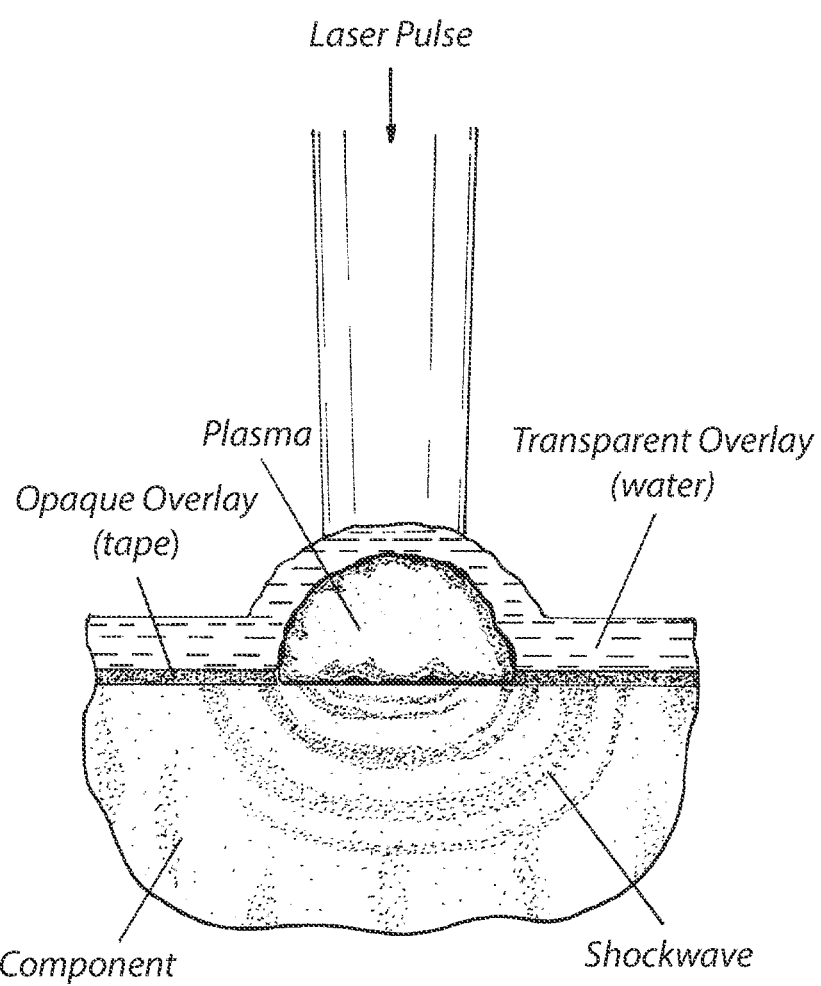

The cold working technique can include a deep rolling tool with applied normal load, ball-peen hammer, high frequency impact treatment, ultrasonic impact treatment, or laser shot peening using the DED machine laser or a standalone pulsed laser system. For example, referring to FIGS. 6A-6D, embodiments of cold working systems and methods can include one or more of deep rolling (e.g., as shown in FIG. 6A), ball-peen hammering (e.g., as shown in FIG. 6B), ultrasonic impact treatment 28 (e.g., as shown in FIG. 6C), or laser shot peening (e.g., as shown in FIG. 6D). The cold working system can be stationary with the option of motion in the Z direction while the machine table can be moving to ensure that the whole layer surface is severely plastically deformed with the predicted step over.

Modeling can play a key role in specifying the deposition and cold working parameters. Computational additive manufacturing models can aid in specifying the constituent elements and their respective concentrations and feed rates to achieve the desired CCA and/or HEA properties. Plasticity models can also be employed to determine the amount of cold working necessary for the desired microstructure and final residual stress.

FIG. 5 shows a flowchart of how the models, deposition, and cold working can be coupled. Any other suitable arrangement or composition of method portions is contemplated herein. For example, all modeling can be run before the building the part, and not real time. However, any suitable real time modeling is contemplated herein (e.g., for plasticity modeling of each layer). It is contemplated that a virtual build can be done in advance, e.g., to define the cold working parameters of each layer, such that real time computation is not required for any portion of the additive manufacturing.

Embodiments of the method can be used for high throughput manufacturing of high temperature material parts, e.g., high temperature heat exchangers, fuel nozzles (e.g., for the oxidation resistance), headers, blades, discs, seals, integrally bladed rotors, and/or combustors of various compositions for next generation aerospace applications. Additionally or alternatively, embodiments of the method (e.g., which can be a DED method) can be employed to repair high temperature parts such as rotors and nozzles.

Embodiments can utilize either elemental powder or alloy powder which can be fed individually to the nozzle 100. Traditional DED nozzles, for example, do not have the ability to make CCA or HEA compositions. Embodiment can have at least five powder channels to create an HEA, for example. Embodiments can also have a controller configured to automatically control feed rates to control proportions to create a desired HEA and/or gradient thereof. The controller can control at least five powder channels (e.g., regardless of the total number of channels) at once to produce an HEA (e.g., but can use less as needed where no HEA is desired on a layer or portion thereof).

Properties desired can be correlated to particular HEAs via physics based modeling done prior to printing to come up with additive manufacturing parameters (e.g., feed rates of each powder, e.g., as a function of x-y position in each layer), speed of scan, power of laser, etc.) that provide the desired end characteristics. Using elemental powders to form an HEA is very cost effective as such powders can be less expensive than premixed alloys.

Embodiments of a method can be performed with a single nozzle, however, embodiments can include any number of separate nozzles. Therefore, certain embodiments of a system, e.g., as disclosed above, can include a plurality of nozzles.

Post processing (e.g., cold working) can be utilized to aid in eliminating residual stresses to reduce deformation. Cold working reduces roughness of the surface, and can be done after each layer which can affect the residual stress in the bulk. Cold working the surface can control the microstructure of the CCA and/or HEA which can allow homogeneity of the microstructure (e.g., by breaking up larger grains that tend to form with HEA construction due to combination of different elements). Any type of cold working is contemplated herein (e.g., a cold work attachment that is designed to be added to a DED machine configured to make a CCA and/or an HEA).

CCAs and HEAs are alloys that are formed by mixing equal or relatively large proportions of usually four or more elements (five or more in the case of HEAs according to a traditional definition of an HEA). Embodiments include a method for additively manufacturing CCAs and/or HEAs using a laser powder based directed energy deposition (DED) technique with a suitable number of metal powders is proposed. The method can include enhancing the traditional laser powder deposition additive manufacturing machines that can accommodate at most two to four nozzles and two to four hoppers. Embodiments can include a nozzle and system to allow for five or more (e.g., eight) powder channels enabling the deposition of five or more (e.g., eight) different HEA constituent elements and/or alloys simultaneously.

Incorporating the five or more individual powder feeder nozzles and corresponding hoppers, each containing a separate metallic element powder, allows the generation of customized high temperature alloys of specified element concentrations. Example powder elements can include Ti, Nb, Mo, Zr, V, Ta, Hf, Al, Co, Ni, W, Re, Y, B, Fe, Si, C, N, and Cr which could result in single or multi-phase HEAs. Any other suitable elements are contemplated herein.

Embodiments can feed the powder at specific rates to control the percentage of each element in the alloy throughout deposition. In certain embodiments, the feed rate of each nozzle can vary over time during the build to generate a functionally graded high temperature material part. Changing the feed rate of individual constituent elements flowing into the laser can yield HEAs of varying composition and microstructure. A computational model can be used to determine candidate element concentration combinations to yield desirable features such as microstructure and mechanical behavior.

Embodiments can provide the ability to change or grade the composition of a single part during a single build without stopping to manually change the powder or adjust the flow rate. Also, because of the relative novelty of HEAs, much work is needed to characterize different compositions (constituent elements and their respective weight percentages), embodiments can be used for high throughput characterization of different compositions for mechanical, chemical, and microstructural properties.

Certain embodiments include a process to deposit HEAs with closely controlled composition, and the addition of a cold working process such as a deep-rolling to impart improved performance. HEAs have shown promise for use under extreme conditions such as high temperature and oxidative environments. Discovering a new alloy system can be extremely expensive and time consuming using traditional methods. Embodiments can provide a means to quickly manufacture parts with different HEA constituent compositions and characterize the enhanced material properties are proposed which can improve the speed of material discovery.

Once new HEA compositions with desirable characteristics are identified, embodiments of a method can be used to manufacture parts with gradient structures or any other suitable structure, for example. For example, a heat exchanger or fuel nozzle, and/or its support structure, can be manufactured with greater high temperature capabilities in regions of elevated temperature and with improved fatigue resistance in areas susceptible to fatigue.

HEAs have many potential benefits, especially for high temperature (e.g., about 3000° F. and up) applications. Embodiments can reduce fabrication cost and, for example, with the above disclosed modeling, can accelerate certification of methods and systems for making high temperature materials, as well as parts (e.g., for aerospace applications).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An additive manufacturing system, comprising:
   a complex concentrated alloy (CCA) and/or high entropy alloy (HEA) additive manufacturing nozzle, comprising:
      a nozzle body defining at least four powder channels, each powder channel configured to be directly connected to a dedicated powder supply of a plurality of powder supplies to receive a powder from the powder supply for ejecting the powder toward a build area to form an additively manufactured article having a CCA and/or an HEA;
   an energy applicator configured to provide energy to the powder to sinter the powder to form the additively manufactured article; and
   the plurality of powder supplies connected the powder channels, wherein the plurality of powder supplies includes the same number of powder supplies as there are powder channels so that there is a one-for-one powder supply to powder channel relationship with an individual powder supply being independently dedicated to a predetermined powder channel, wherein each powder supply is different from the other powder supplies.

2. The system of claim 1, wherein the at least four powder channels include up to eight total powder channels.

3. The system of claim 1, wherein the at least four powder channels include eight total powder channels.

4. The system of claim 1, wherein the nozzle further comprises an energy application channel defined through the nozzle body and configured to pass energy to the build area to allow energy application to the powder ejected toward or on the build area.

5. The system of claim 4, wherein the energy application channel is an optical channel for passing a laser.

6. The system of claim 5, wherein the energy application channel is surrounded by the powder channels.

7. The system of claim 6, wherein the powder channels are disposed evenly and symmetrically around the energy application channel.

8. The system of claim 7, wherein an axis of the powder channels intersect with an axis of the energy application channel such that powder that is ejected from the powder channels intersects with the laser.

9. The system of claim 1, wherein the each powder channel is configured to change in flow area along a powder flow direction from a powder supply opening, through the nozzle body to an ejection opening.

10. The system of claim 1, wherein the powder channels are angled relative to a center line of the nozzle body, wherein the powder channels converge toward the center line, wherein powder streams flowing from the powder channels intersects with a laser at a predetermined focal point.

* * * * *